Jan. 15, 1963 C. H. LINDSLEY 3,073,682
AUTOMATIC TITRATOR
Filed Aug. 4, 1958 4 Sheets-Sheet 3

INVENTOR.
CHARLES H. LINDSLEY
BY Francis W. Young
ATTORNEY

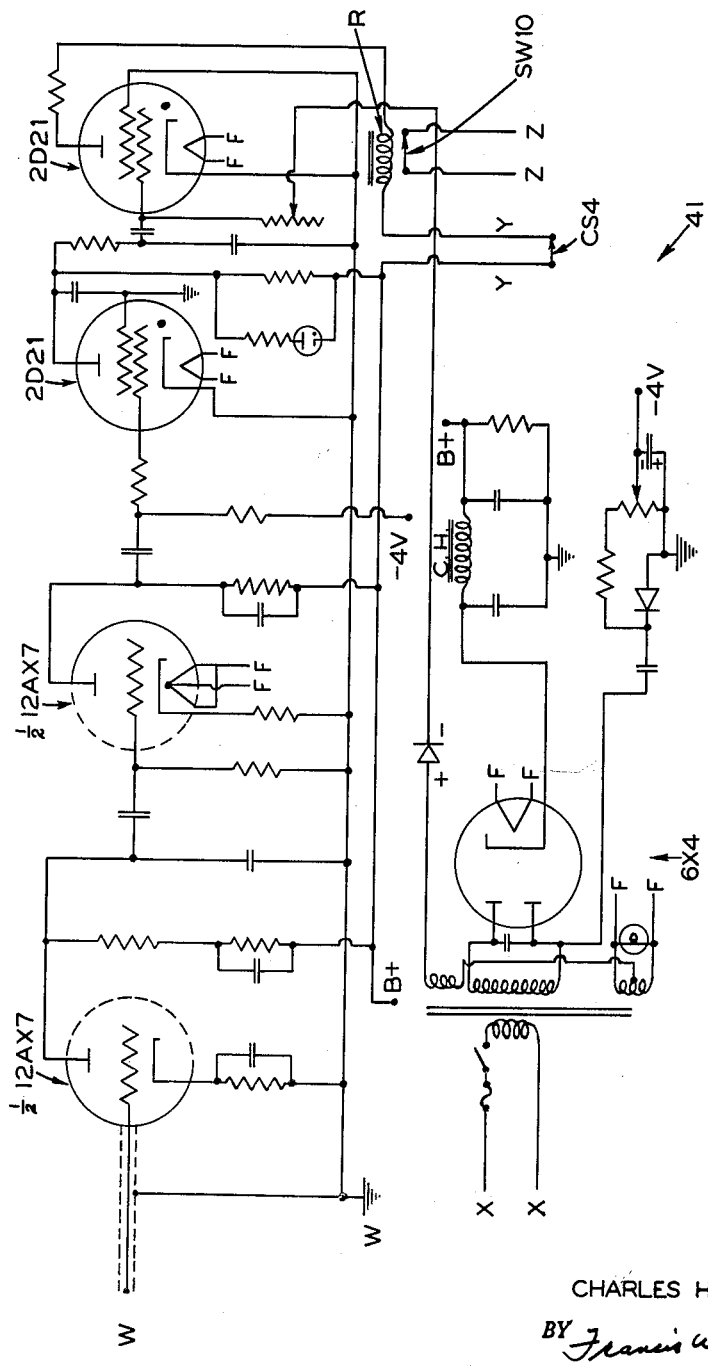

United States Patent Office 3,073,682
Patented Jan. 15, 1963

3,073,682
AUTOMATIC TITRATOR
Charles H. Lindsley, Asheville, N.C., assignor to American Enka Corporation, Enka, N.C., a corporation of Delaware
Filed Aug. 4, 1958, Ser. No. 752,725
4 Claims. (Cl. 23—230)

This invention relates in general to chemical analyzing equipment and more particularly to a process and apparatus for the completely automatic titration of samples delivered and tested in batch form.

Titrations are useful for the quantitative analysis of sample solutions. Many different methods for titrating have been developed in the past. These known methods may be divided into three types for purposes of discussion. The first type is completely manual in operation. A sample of material, for example a solution containing an unknown quantity of acid, is measured by the operator. A suitable color indicator may be added to the sample, after which quantities of a neutralizing solution, or titrant, are added until the solution either changes color, returns to the original color, or becomes clear, depending on the materials used. Large scale manual titration requires considerable skill and also consumes a great deal of time, but may be quite accurate if the operator is sufficiently capable.

In order to obviate the disadvantages of manual titration, only a few of which are mentioned above, various types of so-called "automatic" titrating units have been suggested. For example, continuous titrating systems are described in United States Patent No. 2,627,453, to R. T. Sheen, dated February 3, 1953, and in United States Patent No. 2,668,097, to K. E. Hallikainen et al., dated February 2, 1954. These systems utilize a shunt from the main body of material about which the information is desired, through which shunt a small amount or sample quantity is continuously passed into a titrating vessel. Titrant is continuously mixed with the sample solution in the vessel, the object being to maintain that material within the titrating vessel in a continuous state of equivalence or neutralization. Although this system appears sound from a theoretical standpoint, many disadvantages arise in actual practice. For example, it is extremely difficult to maintain a continuous neutral state, since fresh material to be titrated, and fresh titrant, continuously flow into the titrating cell. Moreover, the results obtained, whether they be visual indications, recordings or corrections, are not as accurate as desired, particularly when compared to the results obtainable through manual titration by a skilled operator. Additionally, a considerable amount of material, not only of the main solution but also of the titrant, is required for the titrating operation. This material of course is useless once titration has been accomplished and, therefore, may be considered waste.

Notwithstanding certain obvious advantages of a continuous titration system such as described above, a sample "batch" unquestionably can be measured out and titrated with greater accuracy than can two continuously flowing streams be blended together. Accordingly, where a high degree of accuracy is essential, the batch system of titration has prevailed. A considerable amount of research and development on the latter titrating system has been done by Dr. H. V. Malmstadt and E. R. Fett. One of their most recent articles, "Automatic Differential Potentiometric Titrations," is reported in the November 1955 edition of Analytical Chemistry, vol. 27, pages 1757 et seq. This article is primarily concerned with the operation and various applications of the Sargent-Malmstadt Titrator, produced by E. H. Sargent and Company of Chicago, Illinois. See also U.S. Patent No. 2,898,200, which issued on August 4, 1959, to the aforesaid Sargent Company.

The Sargent-Malmstadt titrator mentioned above, although generally referred to in the trade as "automatic," actually is automatic only insofar as concerns determination of the end point of titration, which corresponds to the inflection point on a potentiometric titration curve. Briefly, the device operates as follows: A predetermined quantity of a solution to be titrated is manually withdrawn from the supply source and placed in a titrating cell. A pair of electrodes, one reference and the other indicating, is immersed in the sample. The titrator is then placed in operation. This device feeds a titrant into the cell until a sudden change in potential across the electrodes is produced, which corresponds to the end point of titration. This potential change is detected and the resulting signal is amplified through the electronic control circuit described in the aforesaid article and the second derivative thereof is utilized to trigger a relay system for discontinuing the feeding of titrant into the cell at the end point of titration. This unit produces very accurate measurements such as described above in connection with manual titration but lacks the desired operator independence concomitant with practice of the continuous titrating system. In other words, although presence of the operator is not required for the end point determination, it is necessary that he manually select a sample, place the same in the titrating cell, initiate operation of the titrator, take readings from and refill the titrant burette, clean the cell, and repeat these operations when subsequent titrations become necessary.

It can be seen from the foregoing that there are many disadvantages to (a) manual titration of batches, (b) continuous titration of flowing samples, and to (c) single determinations produced by so-called automatic titrators operating on manually-supplied batches.

A primary object of the present invention is to provide a completely automatic titrating process and apparatus having the advantages of known devices but few, if any, of the disadvantages thereof.

A further object of this invention is to provide a completely automatic titrating process and apparatus affording the accuracy of batch type manual titration by a skilled operator, the operator-independence of known continuous titration systems and the rapidity of batch type titrators having electronic control circuits for determining the end point of titration.

Another object of the present invention is to provide a completely automatic titrating process and apparatus which utilizes small quantities of titrant and consumes very little of the main solution to be tested.

Still another object of this invention is to provide a completely automatic titrating process and apparatus which is self-cleaning after each determination, thereby preventing the undesired accumulation of foreign matter through repeated use.

An additional object of this invention is to provide a completely automatic titrating apparatus which is readily portable and thereby versatile in operation.

A more limited object of the present invention is to provide a completely automatic titrating process and apparatus for rapid, precise determination of the acid concentration of any given solution.

A further object of this invention is to provide a process and apparatus which will continuously maintain available at a completely automatic, batch type titrating unit a fresh sample of the solution to be tested.

Another object of the present invention is to provide a completely automatic, batch type titrating apparatus which may be quickly and easily adjusted to vary the frequency at which titrations occur, and which may be reset to change the duration of a titrating cycle.

Still another object of this invention is to provide a completely automatic, batch type titrating apparatus capable of measuring and indicating the quantity of acid contained in samples successively and/or repeatedly withdrawn from any of a plurality of sources, for example, viscose rayon spinning tanks.

The foregoing objects may be accomplished, in accordance with the present invention, by providing means to periodically manipulate a control circuit operable, without assistance from an operator, to feed a measured sample of the main solution to a titrating cell, add titrant thereto, determine the end point of titration, measure and/or indicate the volume of titrant added to effect neutralization of the sample, refill and return the titrant adding means to starting position for subsequent determinations, measure a sample for the next determination, thoroughly wash the titrating vessel, and thereafter drain the same to a predetermined water level for another titration.

Additional objects and advantages of this invention will be apparent to those skilled in this art upon study of the following detailed disclosure of a preferred embodiment taken in conjunction with the attached drawings, wherein FIGURE 1 is a schematic view, in elevation and partly in section, showing a titrating vessel selectively connected to three separate sources of liquid to be tested, as well as the titrant delivery syringe, titrant supply and the valves for automatically isolating the desired sample from the plurality available;

FIGURE 4 is a circuit diagram of the end point determination unit illustrated by block form in FIGURE 2.

Figure 1:
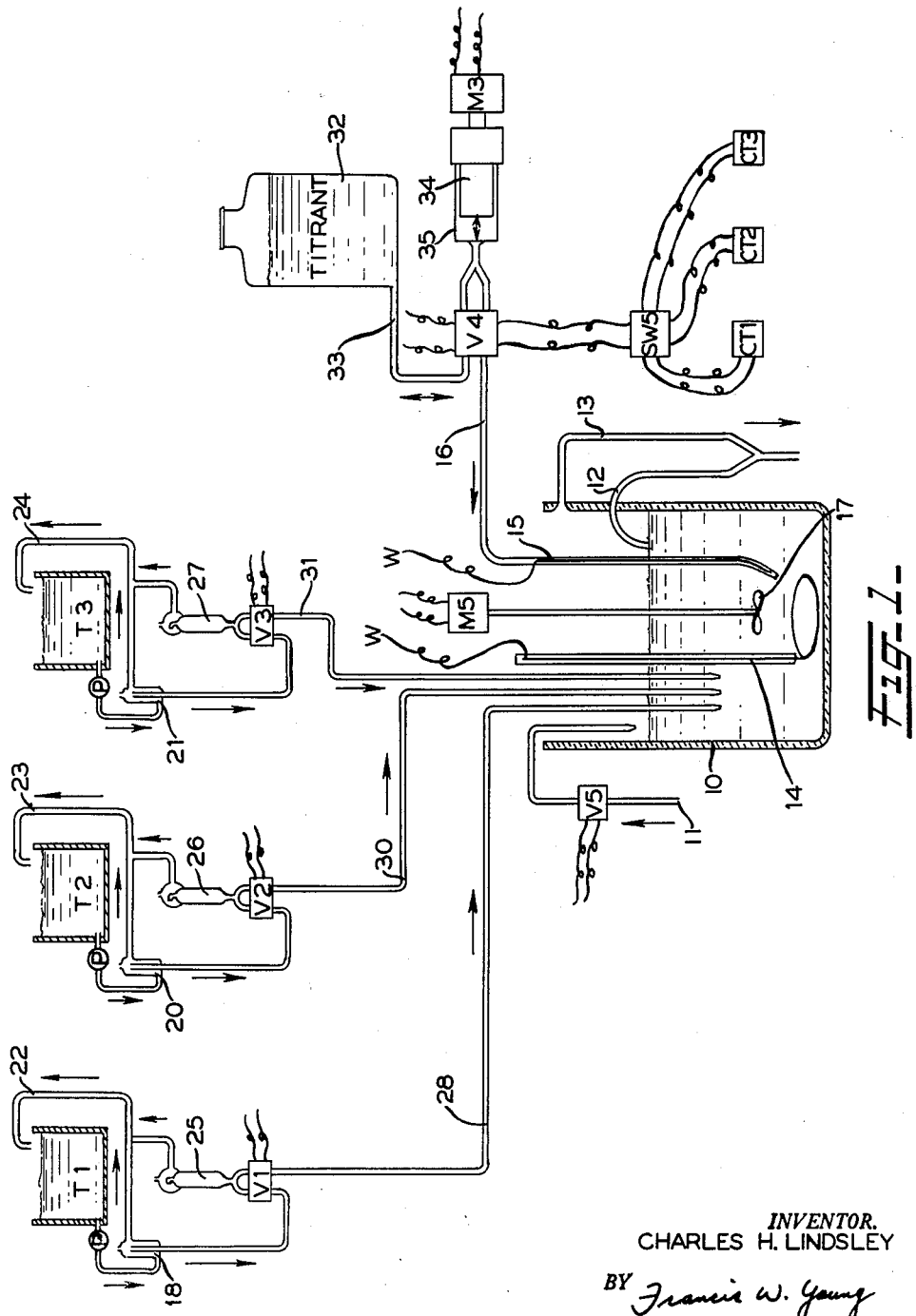

Although definitely not limited to such in its application, the present invention is particularly addressed to the manufacture of artificial filaments and will be described further in connection with determining the composition of spinning baths used for regenerating viscose rayon yarn.

The regular analysis of spinning bath is a very important factor in the control of viscose rayon properties. Variations in spinning characteristics or in yarn properties are definitely related to the composition of the spinning bath. Accordingly, a continuous record of the spinbath composition is very useful in localizing possible reasons for faulty production. Further discussion will be limited to measurement of the acid concentration in the spinning bath, although the concentration of other components, such as zinc, for example, could be made with proper selection of the end point determining means. Such measurements heretofore were normally made on an hourly basis, or multiples thereof, the frequency being determined by the relative importance of exact control balanced with the cost aspect of manual titrations. Oftentimes, however, more frequent analyses were made when particularly close control was required, or when unusually large fluctuations in acid concentration were found, resulting in considerable time and effort expended by an operator. In contrast to this, the present invention may be set or adjusted to produce, automatically, an acid determination as frequently as every three minutes, although the machine shown in the drawings is set up to operate on automatically recurring five minute cycles.

Turning now to the drawings, with attention directed first to FIGURE 1, reference numeral 10 represents a titrating vessel or cell into which the sample to be tested, hereinafter referred to simply as "sample," as well as the titrant, is periodically delivered. This cell may be supported on any suitable surface (not shown). If desired, a table or other framework may be provided for supporting the titrating vessel, the titrant supply, the delivery and measuring syringe, as well as the electronic end point determination unit shown in FIGURE 4. Tube 11 periodically supplies water through solenoid valve V5 for washing the cell 10 and for displacing the sample tested at the end of each operation. Although the acid sample is neutralized at the end of each cycle, thorough washing of the cell with water prevents the accumulation of salts or other foreign matter therein. Syphon 12 drains the cell to a predetermined level at the end of each titration, and overflow tube 13 prevents a sudden oversupply of water from spilling around the titrating apparatus. Syphon 12 and tube 13 may merge, as shown, and connect with a suitable drainage system (not shown). Tube 11 may be connected to any available water source.

Platinum electrodes 14 and 15 are mounted so as to extend into cell 10 with the lower ends thereof being submerged in the liquid contained thereby. Electrode 14 will be referred to hereinafter as the reference electrode, and electrode 15 as the indicator electrode, although the exact function may be reversed, depending on whether an acid or alkali titration is performed. Indicator electrode 15 actually is placed within the hollow interior at the lower end of titrant delivery tube 16, and reference electrode 14 is enclosed within a suitable housing, with the lower end projecting in loop form therefrom, as shown. The operation of these electrodes for producing a change in potential at the exact point of neutralization is well known to this art and will not be discussed in detail. Suffice it to say that an electrical signal is produced between these electrodes at the exact titration end point and fed through conductors $w$—$w$ to the electronic circuit of the end point determination unit, to be discussed further infra.

Stirrer paddle 17 also is submerged in the liquid contained within cell 10 and is driven through stirrer motor M5 to thoroughly mix the sample and titrant during titration. The function of this component, per se, also is well known to this art and requires no further discussion. Although paddle 17 is directly coupled to motor M5, it should be obvious that an indirect, for example, magnetic, coupling would serve the same purpose. Motor M5 may be mounted by any suitable bracket means on the support for titrating cell 10.

First, second, and third viscose rayon spinning tanks T1, T2, and T3, respectively, contain the continuously flowing and constantly changing main solutions on which the acid determinations are based. The spinning baths contained within these tanks are separate and independent and may or may not comprise duplicate chemical compositions or acid concentrations. These tanks are illustrative only and merely represent three sources of acid-containing liquids on which a running record of the exact content is required. Any desired number of sources obviously could be accommodated by appropriate modification of the equipment to be described. A pump P is shown for continuously withdrawing spinbath from each spinning tank, although a gravity flow would suffice if the tanks were properly situated with respect to the titrating cell 10.

By-pass tubes 18, 20, and 21 receive spinbath from tanks T1, T2, and T3, respectively, and permit return of this bath through drains 22, 23, 24, respectively, to the corresponding spinning tanks in the event that an over-supply is provided. From the by-pass tubes 18, 20, 21, the spinbaths flow through valves V1, V2, V3, respectively, into the sampling or sample supply pipettes 25, 26, 27, respectively. Each of the valves V1, V2, V3, may be of the multiple port, two-position type, being spring-urged into the first position and solenoid operated into the second. In the first, or normal, position spinning bath is permitted to flow continuously from one of the by-pass tubes into the corresponding sampling pipette, and out through the appropriate drain tube back into the spinning tank, thereby providing a fresh sample at all times in the sampling pippettes. In the second position of adjustment, these valves close off the supply of spinbath from the by-pass tubes and permit drainage of the precise quantity contained within sampling pipettes 25, 26, 27 into the titrating cell 10 through spinbath delivery tubes 28, 30, 31, respectively, while diverting the main supply of spinbath back into the appropriate tank. As will be explained later, valves V1, V2, V3 cannot be operated simultaneously. Consequently, spinbath can drain through only one of the tubes 28, 30, 31 in any given cycle. As shown in FIGURE 1, the lower or delivery end of each tube 28, 30, 31 is submerged in the liquid contained within the titrating cell.

Titrant supply container 32, which may be supported by the titrating cell mounting framework, as mentioned earlier, is provided for maintaining a supply of titrant. In the titration of spinbath for acid concentration, this container may be filled with standard alkali, such as sodium hydroxide. Titrant or alkali delivery valve V4 controls the withdrawal of alkali from the supply container through titrant filling tube 33, and the delivery of this titrant to cell 10 through delivery tube 16. The flow of alkali through tube 33, which is bilateral, is determined by the movement of plunger 34 of the syringe-burette 35. Reversible burette motor M3 controls movement of plunger 34 toward titrant control valve V4 to expel titrant from the syringe, or away from this valve to refill the syringe. During movement of the plunger in the expelling direction, the alkali may be forced back into the container 32, or delivered to titrating cell 10, depending on the position of valve V4, as will be discussed further hereinafter. Valve V4 may be identical to valve V1 discussed above, that is, solenoid operated into the delivery position and spring-urged into the burette filling position. Also, as will be explained later, energization of the solenoid shifting valve V4 into the titrant delivery position simultaneously actuates one of the counting devices CT1, CT2, CT3, which correspond to respective spinning tanks T1, T2, and T3. These counters are shown in block form only in FIGURE 1.

Figure 2:
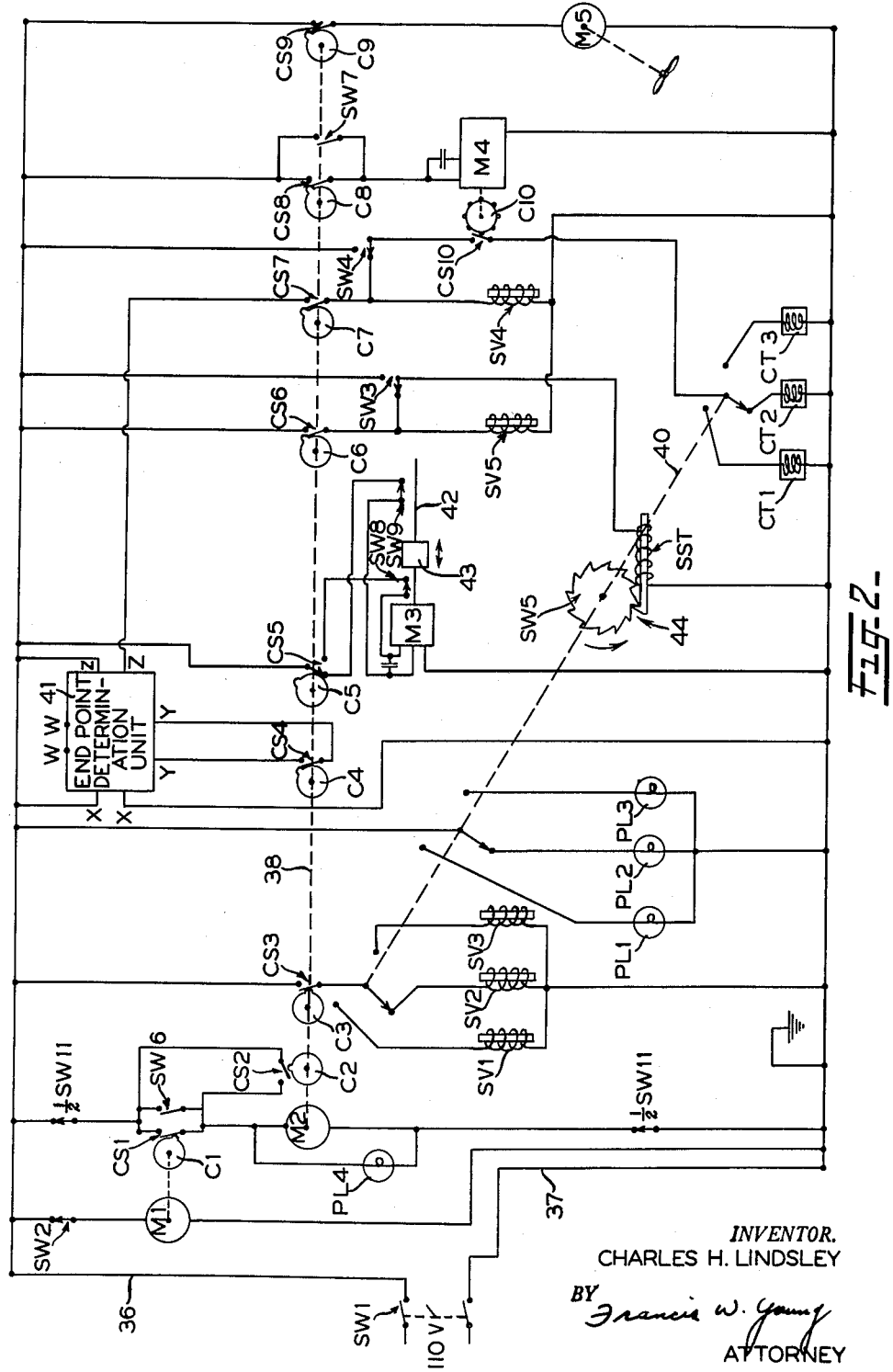
FIGURE 2 is a circuit diagram of a preferred embodiment illustrating operation of the switches and solenoid valves necessary for successive and/or repeated selection of a sample from three independent sources.

With attention now directed to the control circuit illustrated in FIGURE 2, a satisfactory mechanical means for operating the various components in the desired sequence will be discussed. Note that all mechanical shaft connections are indicated by dashed lines and that the electrical conductors appear in full lines, which is customary practice.

It is desired that some master controller be provided for determining the frequency of, and for initiating, each cycle of titration. This may be accomplished by cycle initiating motor M1, which drives or rotates cycle initiating cam C1. This motor is directly connected across 110 volt leads or power supply 36, 37, which leads are energized through main (DPST) switch SW1 connected to any suitable source of current. If desired, the switch SW1 may be replaced with a conventional 110 v. male plug for energization of the entire control circuit from an ordinary female wall receptacle, which would be highly desirable if continued portability of the unit were necessary.

It is preferred that cam C1 be of the adjustable type, that is with variable lobes, or that the speed of motor M1 be variable, in order to adjust the cycling frequency for accommodating numerous industrial applications. As shown in FIGURE 2, motor M1 rotates one complete revolution every five minutes, thus producing a cycling period of five minutes' duration, as will be explained. The same result would be obtained, of course, if motor M1 rotated once every thirty minutes, with six equally spaced cam lobes projecting from C1. The five minute rotation of M1 has been selected for purposes of illustration only. Manually operated SPST switch SW2 is provided for de-energizing cycle initiating motor M1 in the event that maintenance is required, or if a single cycle only, or single titration, is desired. This switch normally remains closed, as shown.

During each cycle of operation, or during each complete rotation of the same, cam C1 momentarily closes cam switch CS1. Closing of this switch completes the circuit from conductor 36 through sequence cam motor M2 to conductor 37, which starts rotation of motor M2. The drive shaft 38 of this motor supports a bank of cams for controlling the sequence of the various steps or operations necessary to automatic titration in accordance with the teachings of this invention. The function of each cam will be discussed presently, after which one complete cycle of operations of the entire unit will be described in detail.

Sequence motor cam C2 closes normally open SPST switch CS2, which is wired in parallel with CS1, and locks in the circuit established by the latter switch. The lobe on cam C2 is designed to maintain switch CS2 closed throughout the remainder of a cycle initiated by cam C1. See the cam layout chart of FIGURE 3. After initial rotation of C1, the purpose of switch CS1 has been served, and this switch may be opened placing the same in condition for a subsequent cycling operation. Normally open, push button switch SW6 (SPST) also is wired in parallel with cam switches CS1 and CS2, and serves as a means for manually initiating a titrating operation, if such is desired or becomes necessary.

Normally closed DPST switch SW11 is placed in the M2 circuit between conductors 36, 37 for the purpose of manually terminating the titration operation at any stage without affecting the frequency of cycles. With this switch open, it can be seen that motor M2 cannot become energized by either of the switches CS1, CS2, or SW6. A double pole switch was chosen at this point purely for purposes of safety, the polarity of conductors 36, 37 not being critical since both will be disconnected from motor M2. Such a switch was desired in the motor M2 circuit because any maintenance occurring in the vicinity of this motor no doubt would involve placing the operator in contact with various liquids. Pilot light PL4 is wired in parallel with motor M2 and indicates energization of this motor, as is well known to this art.

Acid delivery cam C3 also rotates with shaft 38 and functions to close cam switch CS3, which completes the circuit from conductor 36 through one of solenoid operated acid delivery valves V1, V2 or V3, thus shifting the operative valve of this group from the normal position (shunting spinbath from the corresponding spinning tank through that particular sampling pipette and back into the tank) into the second position which delivers this spinbath sample into the titrating cell 10. The solenoids SV1, SV2 and SV3 shown in FIGURE 2 correspond with and control valves V1, V2, V3, respectively. The circuit through solenoids SV1, SV2, SV3 is completed by the rear section of three-section, three pole rotary stepping switch SW5, which will be described more fully hereinafter. In the position shown by FIGURE 2, closing of CS3 energies solenoid SV2 which shifts acid delivery valve V2 into the second operative position thereof and delivers a spinning bath sample from spinning tank T2 into the cell 10. It will be apparent that switch CS3 similarly controls delivery through valves V1 and V2 upon proper positioning of selector switch SW5. Acid delivery cam C3 of course must be designed to hold the solenoid valves energized a sufficient amount of time to permit complete drainage of the sampling pipettes. See FIGURE 3.

Pilot lights PL1, PL2, PL3, are wired through the center section of SW5 and indicate sampling or testing of spinbath withdrawn from one of the corresponding spinning tanks T1, T2, T3. It will be evident from inspection of the drawing that one and only one of these pilot lights will function at all times (except the time interval required to step switch SW5 to the next set of contacts), or so long as the titrating apparatus is energized either through SW1 or a suitable wall plug. Consequently, an operator inspecting the machine may determine immediately which spinning tank is being tested, or which tank is in condition for testing. Rotation of the stepping switch shaft 40 of course will direct the current from conductors 36, 37 through different solenoids, through corresponding different pilot lights, and through different counters, to be discussed later.

Reset cam C4, at the appropriate time during each cycle, closes and opens cam switch CS4 which makes and breaks a circuit through conductors $y$—$y$ leading into end point determination unit 41. More will be said about the function of CS4 in connection with a discussion hereinafter of the electronic control circuit of unit 41. Suffice it to say at this point that cam C4 and cam switch CS4 periodically condition the electronic control circuit for repeated titrations, or end point determinations.

Figure 3:
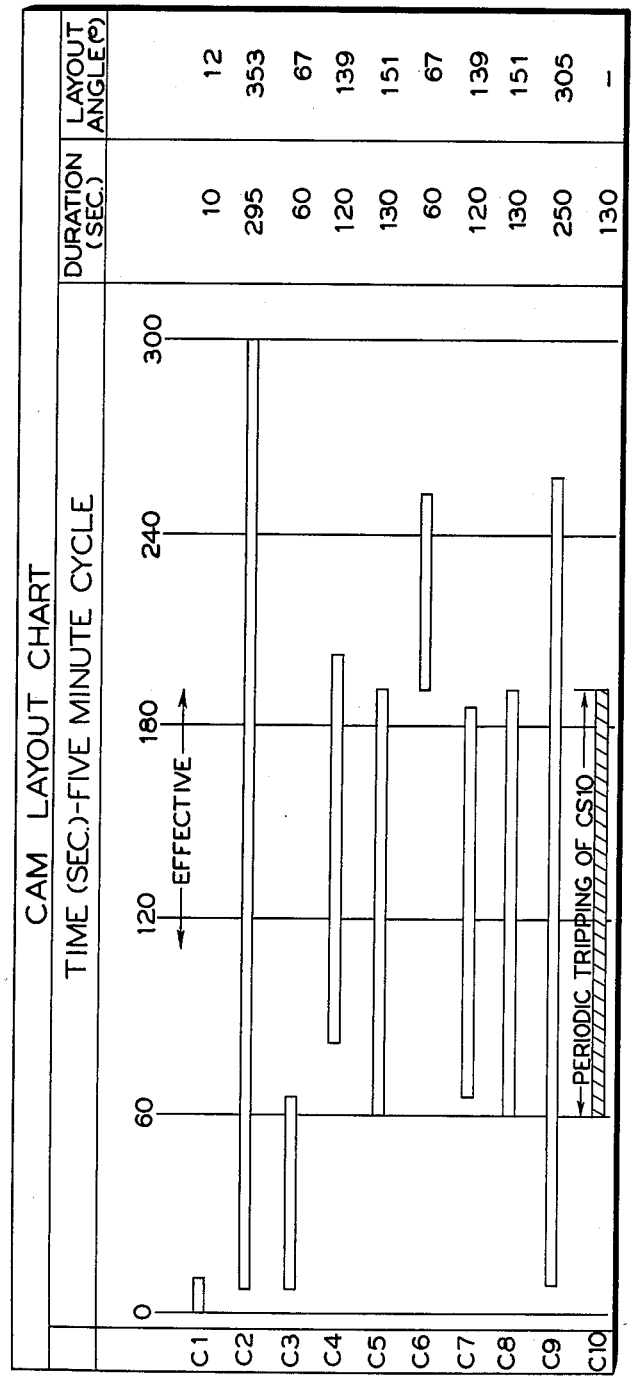
FIGURE 3 is a layout chart of the various cams shown in FIGURE 2.

Burette cam C5 engages and selectively controls SPDT cam switch CS5 and thereby determines the direction of rotation of reversible burette motor M3, which has independent windings alternately connected in series with this switch. In one position of CS5 (say, for example, that position shown) motor shaft 42 rotates in a first direction to retract plunger 34 (see FIGURE 1) and thereby fill syringe-burette 35. When plunger 34 has completely retracted, normally closed limit switch SW8 will be opened by trip mechanism 43 mounted for sliding movement in response to rotation of shaft 42. Opening of SW8 will open the circuit established by CS5. In the alternate position of CS5, motor M3 will rotate in the opposite direction to expel titrant from syringe-burette 35. Limit switch SW9 is provided as a safety measure to stop rotation of M3 and travel of plunger 34 prior to damage of equipment. As an alternative operation, this switch may serve to stop rotation of the motor prior to reversal by cam C5 and CS5, although the preferred cam layout shown in FIGURE 3 illustrates that cam C5 reverses switch CS5 in ample time to prevent contact between trip mechanism 43 and limit switch SW9.

Cam C6 in this preferred embodiment performs two independent but related functions by closing normally open SPST cam switch CS6. As can be seen, switch CS6 completes a first circuit from conductor 36 through solenoid SV5 to conductor 37. Solenoid SV5 represents the control means for selectively positioning the water delivery valve V5 shown in FIGURE 1. Energization of SV5 shifts V5 into the delivery position, permitting passage of water from pipette 11 into the titrating cell 10. Cam switch CS6 also closes a parallel circuit from conductor 36 through switch SW3 to the solenoid SST of stepping switch SW5, and finally to conductor 37. This energizes SST and actuates an escapement mechanism 44 to shift selector switch SW5 into the next operating position which, as mentioned earlier, disconnects the titrating apparatus from one spinning tank and connects it to the next tank. Switch SW3 preferably is of the SPDT type with a central off position. Accordingly, by proper manipulation of this switch, solenoid SST may be directly connected to conductor 36 to manually set SW5 for sampling of any desired spinning tank, it may be set for completely automatic operation in the manner illustrated, or the switch SW3 may be left in the central open position, in which case titration of the same spinning tank will be repeated until the selector switch is again connected to the circuit. The cycling water valve solenoid SV5 of course will continue to operate in the manner explained irrespective of the setting of SW3, since this solenoid operates through a parallel circuit. Water valve V5 does not deflect flow in the same manner as valves V1—V4, but merely permits or prevents flow of water into the cell 10.

Titrant or alkali delivery cam C7 periodically opens and closes cam switch CS7 to determine the position of titrant delivery control valve V4 and also operation of the counters. When CS7 is closed, solenoid SV4 of valve V4 is energized from conductor 36, through conductors $z$—$z$ and the end point determination unit 41 to conductor 37. This shifts valve V4 into titrant delivery position, and deflects the flow of titrant from burette 35 into the titrating cell 10. Closing of CS7 also energizes a parallel circuit through switch SW4, intermittently cam-operated pulsing switch CS10 and the solenoids of one of the counters CT1, CT2, or CT3. With attention directed for the moment to FIGURE 4, it will be seen that conductors $z$—$z$ are wired in series with normally closed, relay-operated switch SW10 within the unit 41. A brief description of the electronic control circuit within unit 41 will now be given. As can be seen, the unit contains detecting, amplifying, differentiating and relaying circuits.

Conductors $x$—$x$ lead from conductors 36, 37 (in FIGURE 2) through a suitable fuse and on-off switch to a power transformer shown at the lower left of FIGURE 4. The power supply is designed around a conventional 6X4 full wave rectifier tube. Leads $w$—$w$ connect the electrodes 14, 15 (FIGURE 1) with the detector and amplifier stages of the electronic circuit, represented by a conventional dual or duplex triode vacuum tube 12AX7. The signal originating between the titrator electrodes is fed through and from the second half of the amplifier tube to first thyratron tube 2D21, which functions as a relaxation oscillator in response to the incoming signal to produce a control signal. From first thyratron 2D21 the control signal is fed to a second thyratron 2D21, which is the control tube for operating relay R. As can be seen in the circuit, this relay can be energized only when cam switch CS4 is closed. Moreover, the relay R will remain energized until such time as the circuit $y$—$y$ is broken. Energization of relay R opens the normally closed control switch SW10 which breaks the circuit through SV4 and the counters, thereby shifting titrant delivery valve V4 into the non-delivery position and simultaneously interrupting the counting operation. Switch SW10 will remain open until cam C4 breaks circuit $y$—$y$ and permits de-energization of relay R, which conditions the circuit for another titrating operation.

Switch SW4 preferably is SPDT, with one side thereof wired direct to conductor 36, as shown, in order that the counters may be manually controlled if desired. Such manual control is useful in calibrating the counters, in verifying the operation thereof, or for general maintenance purposes. The counters CT1, CT2, CT3, may be the conventional solenoid-operated type, with each pulse passing therethrough actuating the counting mechanism to the next succeeding digit. These counters are calibrated to read hundreds of a milliliter of alkali fed by plunger 34, but other calibrations obviously could be provided if desired. The counters are wired in parallel between conductor 37 and the front section of selector switch SW5 as shown, and are selected in the same manner as are corresponding valve solenoids SV1, etc., and pilot lights PL1, etc. If desired, these counters also may be of the printer type, to record the final count of each determination.

It is pointed out that, notwithstanding the closed position of cam switch CS7 and control switch SW10, the counter CT2 (which is in the operating position illustrated by FIGURE 2) actually counts only in response to the closing and opening of pulsing unit cam switch CS10. This switch is actuated by rotation of pulsing unit cam C10 mounted on the shaft of pulsing unit motor M4. Cam C10 may be an eccentric lobe on this motor shaft, in which case switch CS10 would be opened and closed once for every revolution of M4, or it may constitute a cam having a predetermined number of lobes. In either case, the number of pulses per unit time must be suitably calibrated with respect to the quantity of titrant delivered by plunger 34. Suitable calibration may be determined by experiment. It is important only that the counter and titrant delivery valve operate simultaneously. The parallel circuit shown provides this operation.

Pulse control cam C8 closes pulse control cam switch CS8, which energizes pulse unit drive motor M4 from conductors 36, 37. Energization of M4 rotates pulsing cam C10 in the manner explained to produce a predetermined number of impulses through the operative counter in a given amount of time. SPST switch SW7 is wired in parallel with CS8 so that the pulse unit drive motor may be operated independently of the remaining controls, for calibrating, testing or any other purposes desired.

Finally, stirrer motor cam C9 controls energization of stirrer motor M5 through cam switch CS9. Operation of this motor imparts rotation to paddle 17 for mixing the contents of titrating cell 10, as explained earlier.

OPERATION

With attention now directed to FIGURES 2 and 3 in particular, with occasional reference to FIGURES 1 and 4, one complete cycle of operations will be explained. The block diagrams in FIGURE 3 represent the time during which the respective cams are effective, either in closing, opening, or shifting corresponding cam switches.

Switch SW1 should be closed or if a wall plug is used the same should be connected to a suitable source of current. SW5 as shown is in position for sampling and titrating spinbath from T2, with PL2 energized upon closing of SW1. SW3 is placed in the automatic position shown and switches SW2, SW11 are in normally closed position. CS5 is in that position enabling reverse rotation of burette motor M3, and limit switch SW8 has disconnected this motor from the circuit, stopping rotation thereof with the burette filled. M1 is energized from the closing of SW2, thereby imparting rotation to C1 and momentarily closing CS1. Closing of CS1 energizes M2 and PL4, causing rotation of the former. Rotation of M2 imparts rotation to shaft 38 and the entire cam bank C2—C9 supported thereby.

Immediately upon rotation of the cam bank, C2 closes CS2, thereby locking in the circuit through M2 for one revolution (here set up for one revolution per five minutes). After closure of CS2, CS1 may be opened or re-set for a subsequent cycle. This may be accomplished at any time during the remainder of this cycle, but as shown occurs within a few seconds after closing of CS2. Simultaneously with closing of CS2, C3 closes CS3 to energize V2 through SV2. This shifts V2 from the first position (permitting passage of spinbath from T2 into the corresponding sampling pipette 26 which is the normal or inoperative position) to the second position, which closes off the supply from T2 and drains the sample from this sampling pipette into the titrating cell. Also operating simultaneously, C9 closes CS9 which energizes motor M5 and causes rotation of the paddle 17 for stirring the contents of the titrating cell. It is not essential that these three operations occur simultaneously, but this has been found to be a convenient arrangement which operates quite satisfactorily.

As mentioned above, the normal ineffective position of cam C5 has previously tripped SPDT switch CS5 into the position which energized burette motor M3 for reverse rotation. This retracted the plunger 34 and filled the syringe-burette 35 with titrant from the titrant supply 32 through titrant filling tube 33 and V4, which normally rests in a position permitting this flow while preventing flow into the titrating cell. When the plunger reached the withdrawn position, limit switch SW8 stopped rotation of M3 by opening the circuit thereto. Cam C5 next becomes operative and trips switch CS5 into the first position, energizing burette motor M3 for forward rotation, or rotation in a direction to force the titrant contained within the syringe toward valve V4. Since valve V4 has not as yet been shifted, the titrant is momentarily forced back into the supply container 32, which eliminates erroneous determinations due to back-lash or worn gearing.

Operating simultaneously with the foregoing, C8 closes CS8 to energize pulse motor M4. This motor begins rotating, causing pulsing cam C10 to periodically open and close CS10. This does not result in operation of counter CT2 at this point, however, because CS7, which is in series with CS10, is still open. By this time, solenoid valve V2 has emptied the sample of spinning bath from T2 into the titrating cell 10, and cam C3 may operate to open switch CS3, restoring V2 to the first position feeding a continuous supply of fresh spinning bath back into and through the sampling pipette 26 for a subsequent titration.

De-energization of solenoid SV2 may occur simultaneously with the following operation, if desired. One or two seconds after the energization of M3, cam C7 closes normally open SPST microswitch CS7 and energizes solenoid SV4 in valve V4. This shifts V4 into the second position thereof, permitting the titrant which is being forced therethrough by plunger 34 to flow through tube 16 into the titrating cell 10 rather than back into the supply container 32. Closing of switch CS7 also completes the circuit through pulsing switch CS10 and counter CT2, since the counters are wired in parallel with SV4. Consequently, the intermittent making and breaking of CS10 will produce pulses through a circuit composed of counter CT2, CS10, SW4, CS7 and conductors z—z leading through the normally closed relay-operated switch SW10 in end point determination circuit 41. Counting and feeding of titrant into the titrating cell 10 will continue until the switch SW10 is opened by this control or differentiation circuit 41, to be explained presently.

Cam C4 next operates to close switch CS4 which is in series with the relay R. This conditions the relay for subsequent energization through the electrodes 14, 15, conductors w—w, and differentiation circuit 41.

The aforesaid electrodes generate a potential in titrating cell 10 and feed this potential to the electronic control circuit, where the potentiometric curve thereof is amplified, differentiated to the second derivative and results in the aforesaid control signal which is fed as an output through the relay R mentioned above. This energizes relay R and opens the normally closed switch SW10 connecting the conductors z—z. Opening of SW10 de-energizes SV4, thereby permitting V4 to return to its normal position feeding titrant from the syringe back into the supply chamber, and simultaneously opens the counter circuit through CT2, thereby discontinuing the counting operation. Relay R remains energized and holds switch SW10 in open condition. Next, cam C7 opens switch CS7 and conditions the circuit through z—z so that SW10 may be closed, as will be explained.

Cam C5 at this point may become inoperative and restore switch CS5 to its normal position, thereby reversing burette motor M3 for refilling the syringe-burette 35. This motor will be stopped by limit switch SW8, as explained above, when the syringe-burette is completely filled. As an alternative arrangement, burette motor M3 may be de-energized by limit switch SW9, after which cam C5 may operate to reverse the motor circuit for refilling the syringe, as explained earlier. If desired, cam C8 may open switch CS8 simultaneously with this operation, and de-energize pulse unit drive motor M4, since the pulses are no longer emitted through the counter circuit. This, of course, stops rotation of cam C10.

Cam C6 now may close switch CS6 to energize solenoids SV5 and SST. Energization of the former opens valve V5, which thereby permits the flow of water through tube 11 into the titrating cell 10 for flushing or washing purposes, and energization of the latter (through SW3) rotates stepping switch SW5 to the next position, in this case for sampling the spinbath in tank T3. Operation of V5 and SW5 obviously need not occur simultaneously, or by the same cam means, but the circuit disclosed has proved satisfactory for these purposes.

Cam C4 next operates to open switch CS4, which de-energizes relay R within the electronic control circuit 41, permitting re-setting of switch SW10 through resilient means to the normal operating position thereof.

At the end of the washing cycle, which is for 60 seconds in the embodiment disclosed, cam C6 operates to open CS6, permitting return of V5 to the normally closed position and releasing the escapement mechanism 44 in SST for a subsequent operation. With the supply of water discontinued, the titrating cell will drain to the proper level determined by the syphon 12.

Cam 9 may now open the circuit through CS9 leading to stirrer motor M5, since the flow of liquids to the titrating cell has been completed for this particular sampling operation.

Shortly following the above operation, cam C2 reaches the end of one revolution and microswitch CS2 opens, de-energizing sequence cam motor M2. This motor remains inoperative until the cycling or cycle initiating motor M1 again closes CS1 to begin a new sampling operation, the next time with spinbath withdrawn through sampling pipette 27 from tank T3.

EXAMPLE

In order to test the precision of the titrating apparatus described hereinabove, a large number of acid determinations were made, first with sulfuric acid, then with spinbath used in processing textile yarns, and then with spinbath used in processing industrial yarn such as tire cord. Representative sequences are tabulated in Tables 1 and 2 hereinbelow. Since only the precision of the apparatus was tested, the exact volume of sample taken and the exact concentration of standard alkali used were not determined; only the volumes of base required for successive titrations were recorded.

Table 1

REPEATED TITRATIONS OF TEXTILE SPINBATH (30 DETERMINATIONS MADE AT 5-MINUTE INTERVALS)

[Volume of alkali used, ml.]

| 8.11 | 8.19 | 8.13 | 8.14 | 8.14 | 8.17 | 8.14 | 8.12 |
|------|------|------|------|------|------|------|------|
| 8.13 | 8.15 | 8.15 | 8.18 | 8.17 | 8.09 | 8.16 | 8.19 |
| 8.21 | 8.15 | 8.14 | 8.13 | 8.11 | 8.17 | 8.15 |      |
| 8.15 | 8.17 | 8.16 | 8.15 | 8.14 | 8.19 | 8.12 |      |

Average _____ 8.150 ml.
Average deviation _____ ±0.021 ml.
Standard deviation _____ 0.027 ml.
Coefficient of variation _____ 0.0033.

Table 2

REPEATED TITRATIONS OF TIRE YARN SPINBATH (40 DETERMINATIONS AT 3-MINUTE INTERVALS)

[Volume of alkali used, ml.]

| 6.41 | 6.42 | 6.43 | 6.42 | 6.43 | 6.43 | 6.41 | 6.42 |
|------|------|------|------|------|------|------|------|
| 6.42 | 6.43 | 6.42 | 6.42 | 6.43 | 6.42 | 6.45 | 6.43 |
| 6.43 | 6.42 | 6.41 | 6.40 | 6.42 | 6.41 | 6.44 | 6.44 |
| 6.41 | 6.43 | 6.43 | 6.43 | 6.40 | 6.44 | 6.41 | 6.43 |
| 6.44 | 6.42 | 6.43 | 6.43 | 6.43 | 6.42 | 6.45 | 6.43 |

Average _____ 6.425 ml.
Average deviation _____ ±0.0095 ml.
Standard deviation _____ 0.014 ml.
Coefficient of variation _____ 0.0022.

From these data, it is clear that the reproducibility of the completely automatic titrating apparatus described herein is very satisfactory. Moreover, it is easily seen that this equipment can be used to perform a wide variety of titrations completely automatically. In general, any titration where there is a sufficiently rapid change in potential at the stoichiometric endpoint to actuate the control unit may be determined with this apparatus. Without any modification this unit can be used to analyze any of the lye systems for alkali. With slight modification various other determinations may be made. Moreover, the apparatus described is not limited in application either to the determination of acid concentration, or to use with three sources of sampling material. Upon study of this disclosure, it should be obvious to those skilled in this art that the control circuits may be expanded to accommodate successively and/or repeatedly any reasonable number of spinning tanks or other sample sources.

The various switches described above, manual or cam-operated, may be of any suitable type. Although the functions of these switches is very important, the structure thereof is not. It has been found that spring loaded microswitches operate very satisfactorily for performing the functions intended of the various cams. Toggle switches are satisfactory where manual controls are desired, and push-button switches also operate satisfactorily where only momentary manual control is necessary, for example at SW6 for initiating a titrating cycle. Although cam switches CS1–CS4, inclusive, and CS6–CS10, inclusive, as described herein are normally open, it is obvious that circuits employing normally closed switches could perform the same functions, the only difference being in the mode of operation of the delivery valves, stepping switch, counters, etc.

As explained in the detailed description hereinabove, sequence cam motor M2 determines the duration of each cycle. The particular motor M2 appearing in FIGURE 2 undergoes a single revolution only during each cycle. Consequently, the speed of this motor directly affects the duration of a cycle. In order to vary the duration, it is necessary either to select another motor M2 having a different r.p.m., or to insert a transmission between M2 and shaft 38. If frequent change in duration is contemplated, the latter alternative should be incorporated into the apparatus design. For most purposes, however, a constant cycle duration, such as the five minute cycle disclosed, will be satisfactory. In this embodiment, this means that motor M2 revolves once in five minutes. The same sequence of operation of course will occur even if M2 revolves once in three minutes to perform the test outlined in Table 2, above, but the duration of some or all of the individual steps must be shortened.

The frequence of cycling, or the period between cycles, may be varied either by selection of a different motor M1, by adding a transmission between this motor and the shaft therefor, or in the manner described as the preferred alternative, which is through the use of an adjustable cam C1. Although the motor M1 disclosed rotates once every five minutes, it is preferred that the same operate at one revolution per thirty minutes. This means that no more than six equally spaced cam lobes can project into operative position from cam C1 since, with the system described, five minutes are required per cycle after C1 closes CS1. Less than six lobes of course could be used. For example, if four equally spaced lobes project from C1, a cycle would be initiated every seven and one-half minutes. Since only five minutes are required per cycle, there would be a rest period of two and one-half minutes after motor M2 completes one revolution. Many different variations obviously are possible. The foregoing is given merely to emphasize the flexibility of this unit and the fact that the accuracy of determinations is in no way affected by a change either in the frequency of cycles or in the duration of a single cycle.

If a permanent chart is desired, the output signal originating between electrodes 14, 15 may be fed to a suitable commercially available recording unit, either in lieu of or in addition to the counters discussed. Additionally, as previously mentioned, the counters may be of the printer type, in which case the printer actuating circuit therefor should be energized after operation of unit 41 but before the end of that cycle. Printer counters of this type normally are automatically re-set to zero after each determination. In the operation of the device disclosed hereinabove, however, counters CT1, CT2, CT3 must be manually re-set, at which time recording of the titration results preferably is made. Failure to record this count would result only in the accumulation of a running total of repeated titrations from the tank corresponding to that particular counter.

The exact sequence of operations disclosed may be changed to accommodate other applications. The exact duration of effectiveness of the individual cams and the corresponding layout angles thereof may be varied somewhat from the chart given in FIGURE 3. By way of example, it is not necessary to wash out the cell 10 completely at the end of a titration, or for the sixty second operating period of cam C6, since the contents thereof are neutral. It is essential, however, that sufficient washing occur to prevent the build-up of salt concentration due to repeated titrations.

Inasmuch as various other modifications will become apparent to those skilled in this art, it is intended that the foregoing be illustrative only and that the scope of this invention be limited only to the extent set forth in the following claims.

What is claimed is:

1. A process for the automatic quantitative analysis of a main solution comprising the steps of shunting a sample portion from said main solution in order to establish a stream flowing through a delivery zone of predetermined capacity, discontinuing the flow through said delivery zone while simultaneously delivering a measured sample therefrom into a titration zone, adding a titrant to said sample immediately after delivery of the same into said titration zone, terminating the addition of titrant at the exact neutralization point of the sample, flushing the neutralized sample from the titration zone while replenishing the supply of titrant, draining the titration zone to a predetermined quantity to condition the same for a subsequent automatic analysis, and subsequently repeating the process on an additional measured sample.

2. An automatic titrating system for repeated quantitative analysis of at least one main solution contained within at least one tank comprising a tube system connected to said tank and through which a shunt portion of said main solution is circulated to provide a continuously fresh supply for titration, a titrating cell for periodically receiving a measured sample of said main solution, sampling means of predetermined capacity connected in said tube system for receiving the solution circulating therethrough and including means for alternately delivering a measuring quantity thereof based on said predetermined capacity to said titrating cell, a two-position valve for controlling the alternate flow of solution through said sampling means, means providing a flowing stream of titrant, means for periodically indicating titrant flow, sequence determining means for operating said two-position valve in order to divert said measured quantity of main solution from said sampling means to said titrating cell and for inactivating said valve after delivery of said measured quantity to resume continuous circulation through the sampling means, said sequence determining means also diverting said flowing stream of titrant into said titrating cell and simultaneously therewith initiating operation of said means for indicating titrant flow, a titration end point determination unit conditioned for operation by said sequence determining means for terminating flow of titrant into said titrating cell at the exact neutralization point of the main solution contained therein and for simultaneously discontinuing operation of the titrant flow indicating means, means for flushing the titrating cell and for re-establishing the flowing stream of titrant, and means for subsequently withdrawing and titrating an additional measured quantity of said main solution.

3. An automatic titrating system as set forth in claim 2 wherein said titration end point determination unit comprises an electronic control circuit having means for detecting the neutralization point of said sample and producing an output signal in response thereto, means for amplifying and differentiating said output signal, and a relay circuit controlled by said output signal and operatively connected to said titrant flowing means and said titrant flow indicator for actuation thereof.

4. An automatic titrating system as set forth in claim 2 wherein said means for periodically indicating titrant flow to said sample comprises a solenoid-operated counter.

References Cited in the file of this patent

UNITED STATES PATENTS

| | | |
|---|---|---|
| 1,993,001 | Geyer | Mar. 5, 1935 |
| 2,241,121 | Daniels | May 6, 1941 |
| 2,650,256 | Lingane | Aug. 25, 1953 |
| 2,666,691 | Robinson | Jan. 19, 1954 |
| 2,668,097 | Hallikainen | Feb. 4, 1954 |
| 2,672,405 | Sheen | Mar. 16, 1954 |
| 2,726,670 | Staunton | Dec. 13, 1955 |
| 2,726,936 | Bernheim | Dec. 13, 1955 |
| 2,811,202 | Schild | Oct. 29, 1957 |
| 2,898,200 | Karr | Aug. 4, 1959 |
| 2,950,177 | Brown | Aug. 23, 1960 |

OTHER REFERENCES

Malmstadt: Anal. Chem., vol. 27, 1955, p. 1757 et seq.